United States Patent [19]

Kobori et al.

[11] Patent Number: 5,347,771
[45] Date of Patent: Sep. 20, 1994

[54] HIGH DAMPING DEVICE FOR SEISMIC RESPONSE CONTROLLED STRUCTURE

[75] Inventors: Takuji Kobori; Koji Ishii; Motoichi Takahashi; Yoshinori Matsunaga; Naoki Niwa; Jun Tagami; Takayuki Mizuno, all of Tokyo; Kunio Furukawa, Kanagawa, all of Japan

[73] Assignees: Kajima Corporation; Kayaba Kogyo Kabushiki Kaisha, both of Tokyo, Japan

[21] Appl. No.: 901,567

[22] Filed: Jun. 19, 1992

[30] Foreign Application Priority Data

Jun. 20, 1991 [JP] Japan ................... 3-148371
Aug. 30, 1991 [JP] Japan ................... 3-219963

[51] Int. Cl.$^5$ ............................................. E04H 9/02
[52] U.S. Cl. ...................... 52/167 R; 52/167 CB; 188/312; 188/282
[58] Field of Search ............ 52/1, 167 R, 167 CB, 52/167 DF; 188/312, 317, 318, 282

[56] References Cited

U.S. PATENT DOCUMENTS

| | | | |
|---|---|---|---|
| 2,714,429 | 8/1955 | Etherton | 188/317 X |
| 3,418,768 | 12/1968 | Cardan | 188/312 X |
| 3,638,885 | 2/1972 | Reed | 188/312 X |
| 4,084,668 | 4/1978 | Rybicki | 188/312 |
| 4,493,659 | 1/1985 | Iwashita | 188/318 X |
| 4,799,339 | 1/1989 | Kobori et al. | |
| 4,838,392 | 6/1989 | Miller et al. | 188/318 X |
| 4,890,430 | 1/1990 | Kobori et al. | |
| 4,901,486 | 2/1990 | Kobori et al. | |
| 4,922,667 | 5/1990 | Kobori et al. | |
| 4,959,934 | 10/1990 | Yamada et al. | |
| 4,964,246 | 10/1990 | Kobori et al. | |
| 5,022,201 | 1/1991 | Kobori et al. | |
| 5,025,599 | 6/1991 | Ishii et al. | |
| 5,036,633 | 8/1991 | Kobori et al. | |
| 5,065,522 | 11/1991 | Kobori et al. | |
| 5,076,403 | 12/1991 | Mitsui | 188/312 X |
| 5,097,547 | 3/1992 | Tanaka et al. | |
| 5,107,634 | 4/1992 | Onada et al. | 52/1 |
| 5,147,018 | 9/1992 | Kobori et al. | |

Primary Examiner—Carl D. Friedman
Assistant Examiner—Robert J. Canfield
Attorney, Agent, or Firm—James H. Tilberry

[57] ABSTRACT

A hydraulic cylinder type high damping device in which a cylinder member or a piston rod member is connected to the frame of a structure and the other member is connected to an earthquake-resisting element integrally secured to the frame. A plurality of passages through the piston connect hydraulic chambers on opposite sides of the piston. The passages are provided with pressure-governing valves which control the flow of oil between the hydraulic chambers. In addition, an accumulator system provides a bypass for oil to flow between the hydraulic cylinders in order to modulate the oil pressure in the damping device. Relief valves are provided in parallel with the pressure governing valves to provide a variable damping coefficient which protects the damping device from overloads caused by excessive seismic shock.

14 Claims, 10 Drawing Sheets

HIGH DAMPING DEVICE FOR SEISMIC RESPONSE CONTROLLED STRUCTURE

BACKGROUND OF THE INVENTION

1. Field of the Invention

The field of the invention relates to passive damping devices for reducing vibrations of a building structure responsive to seismic vibrations or the like.

2. Description of the Related Prior Art

The related prior art includes a variety of active seismic response control systems developed for the safety of structures by incorporating earthquake-resisting variable rigidity elements in the column-and-beam frames of structures, such as disclosed in U.S. Pat. Nos. 4,799,339, 4,890,430, 4,922,667, and 4,964,246.

These prior art active seismic response control systems shift the natural frequency of a structure responsive to the detected predominant period of the seismic vibrations so as to render the structure non-resonant. When an earthquake occurs, however, the predominant period is not always easily identifiable, and/or there may be more than one quake to which a response must be made. In active seismic response control systems, various sensors and controlling computers are usually employed. If a dysfunction occurs, failsafe mechanisms are necessary, and such control means can become complicated and costly. Furthermore, the time required to set failsafe control means into operation can cause additional problems.

SUMMARY OF THE INVENTION

The present invention is a hydraulic cylinder-type passive damper device adapted to be installed in a column-and-beam frame of a structure wherein the main body of the cylinder is connected to a beam of the frame, and a cylinder piston rod is connected to an earthquake-resisting element of a quake-resisting wall or a brace, or vice versa. In the event seismic vibrations or the like impact against a structure, the inventive device provides a high damping resistance force, which is a function of the damping coefficient thereof, in response to the relative deformation between the frame and the earthquake resisting element. This high damping resistance attenuates the seismic vibrations. Various combinations of connections between the cylinder, piston, beam, column, and/or quake-resisting brace are possible.

The present inventive high damping device is a compact mechanism comprising the following elements:

(a) A hydraulic cylinder body adapted to be secured to the frame of a structure or to an earthquake-resisting element of the frame thereof;

(b) A hydraulic piston adapted to reciprocate within the cylinder body;

(c) The piston rod reciprocably extending from one end of the cylinder body and adapted to be secured to the frame of a structure or to an earthquake-resisting element of the frame;

(d) Hydraulic chambers provided on opposite sides of the piston;

(e) A plurality of passages through the piston to provide communication between the opposed hydraulic chambers;

(f) At least two pressure-governing valves provided in said piston passages;

(g) An accumulator provided in a bypass interconnecting the hydraulic chambers;

(h) A pair of check valves in the bypass adapted to permit a unidirectional flow of oil from the accumulator tot he hydraulic chambers; and (i) An orifice provided in parallel with each of the bypass check valves for relieving excess pressure in the hydraulic chambers.

Two or more pressure-relieving valves in the piston protect against pressure leaks in the cylinder body, thereby assuring high damping characteristics in the inventive damping device.

If a poppet-style valve is used as the pressure governing valve, the damping characteristics of the inventive device, independent of temperature, can be achieved by developing a fluid resistance responsive to the magnitude and direction of the seismic vibrations. The accumulator is available in order to bleed air from the system and to provide means for oil expansion and contraction due to temperature variation. The accumulator enhances stability and safety of the device. The orifices provided in parallel with the check valves also relieve the pressure in the hydraulic chambers when the inventive device is subjected to intensive and/or prolonged seismic vibrations. The orifices also simultaneously linearize the damping characteristics of the device.

The damping coefficient of the inventive device is maintained constant against seismic vibrations up to a predetermined level (e.g., 25 cm/sec), and is reduced when the magnitude of the seismic vibrations exceeds that level. For this purpose, additional relief valves are provided in parallel with the pressure governing valves of paragraph (f), supra. The additional relief valves extend through the piston, as aforesaid, to enable a flow of oil between the hydraulic chambers.

Oil leaks in the cylinder body are prevented and sealing is secured by providing the pressure governing valves and the additional relief valves in the piston. Also, when a pressure more than a predetermined value is applied, the relief valves act to release the pressure. Due to such an arrangement of the pressure governing valves and the additional relief valves, the desired damping effect is obtained up to the predetermined level and the device is protected from the danger of damage due to overload caused by seismic vibration impact in excess of the predetermined level.

Summarizing the function of the inventive device, high damping performance is achieved by a simple compact hydraulic cylinder mechanism which is easily secured to a structure. A passive type of high damping is achieved and a high seismic response control effect is obtained without danger of overloading the device due to excessive amplitude and/or frequency of seismic shock.

OBJECTS OF THE INVENTION

It is, therefore, an object of the present invention to provide a passive seismic response control device which does not require computer programming or the like; which is a compact structure capable of being installed within a column-and-beam frame structure; and which provides a high damping function to reduce resonant vibrations of the structure caused by external disturbances such as earthquakes and/or wind.

BRIEF DESCRIPTION OF THE DRAWINGS

The foregoing and other objects and features of the invention will become apparent from the following description of preferred embodiments of the invention with reference to the accompanying drawings, in which.

DESCRIPTION OF PREFERRED EMBODIMENTS OF THE INVENTION

Figure 1:
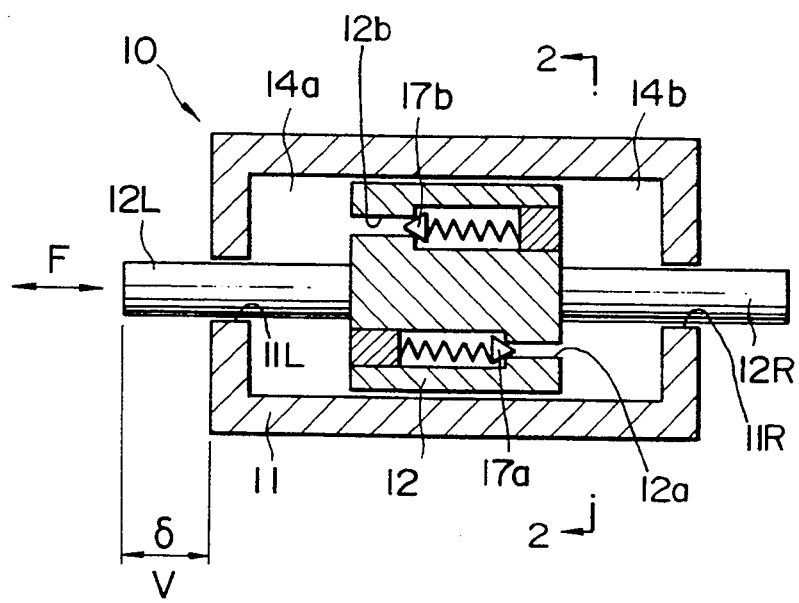
FIG. 1 is a longitudinal schematic sectional view showing the basic structure of a high damping device comprising a preferred embodiment of the present invention.
Figure 2:
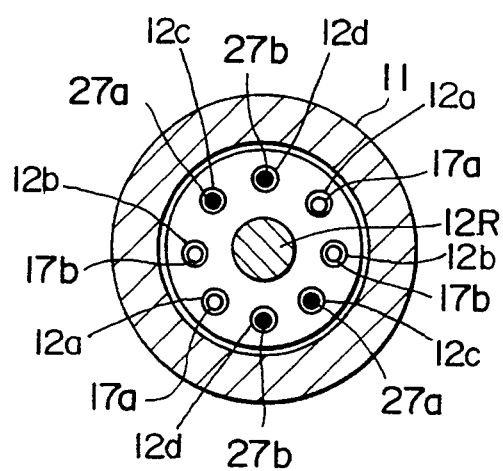
FIG. 2 is a cross-sectional view taken along line 2—2 of FIG. 1.

Reference is first made to FIGS. 1 and 2 which show the basic structure of the inventive high damping device 10 as a preferred embodiment of the present invention, comprising a piston 12, having piston rods 12L and 12R incorporated in orifices 11L and 11R of a cylinder 11, to form hydraulic chambers 14a and 14b.

Pressure governing valves 17a and 17b are provided in piston passageways 12a and 12b which pass through piston 12 to permit oil to flow freely to the hydraulic chamber on the low pressure side of piston 12. For instance, if the piston 12 moves to the right, with reference to FIG. 1, oil pressure will increase in chamber 14b to open pressure governing valve 17a and permit oil to flow through piston passageway 12a into expanding hydraulic chamber 14a. When piston 12 moves to the left, oil pressure will increase in hydraulic chamber 14a and decreas in hydraulic chamber 14b, which causes pressure governing valve 17b to open and permit oil to flow through piston passageway 12b from hydraulic chamber 14a to hydraulic chamber 14b.

In the embodiment of FIG. 1, should a seismic shock exceed a predetermined level, e.g., 25 cm/sec, relief valves 27a and 27b are provided in passageways 12c and 12d, respectively, which pass through piston 12 and function similarly to pressure governing valves 17a and 17b when the load applied to the inventive damping device 10 reaches a precalculated safe limit.

Figure 3:
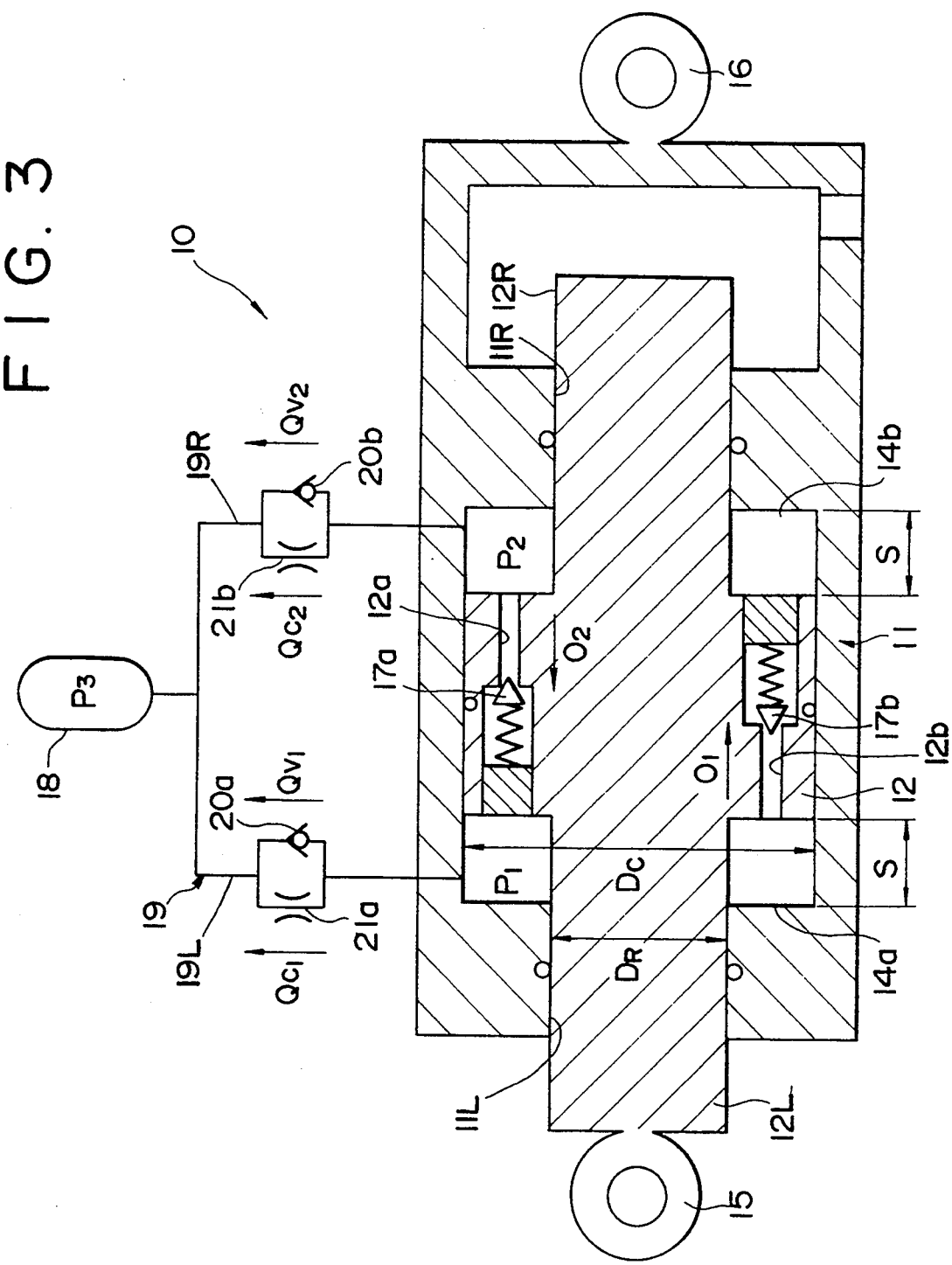
FIG. 3 is a longitudinal schematic sectional view showing the general organization of a high damping device comprising a preferred embodiment of the present invention.

FIG. 3 illustrates another preferred embodiment of the invention in which a piston rod 12L extends from the cylinder orifice 11L only in one direction, i.e., to the left, and mounting rings 15 and 16 are provided on the end of rod 12L and the opposite end of cylinder 11, respectively. Rings 15 and 16 enable the inventive device 10 to be connected between a frame member of a building structure and a resisting member connected between selected frame members.

An oil accumulator 18 is connected to hydraulic chambers 14a and 14b by means of bypass oil line 19. Bypass oil line portion 19L is provided with an orifice 21a and a check valve 20a in parallel. Bypass oil line portion 19R is provided with an orifice 21b and a check valve 20b in parallel. Oil flows between accumulator 18 and hydraulic chambers 14a and 14b responsive to the pressure differential between hydraulic cylinders 14a and 14b and to compensate for oil expansion and contraction in the hydraulic system caused by compression and decompression of the oil during and after operation of the inventive device.

Figure 4:
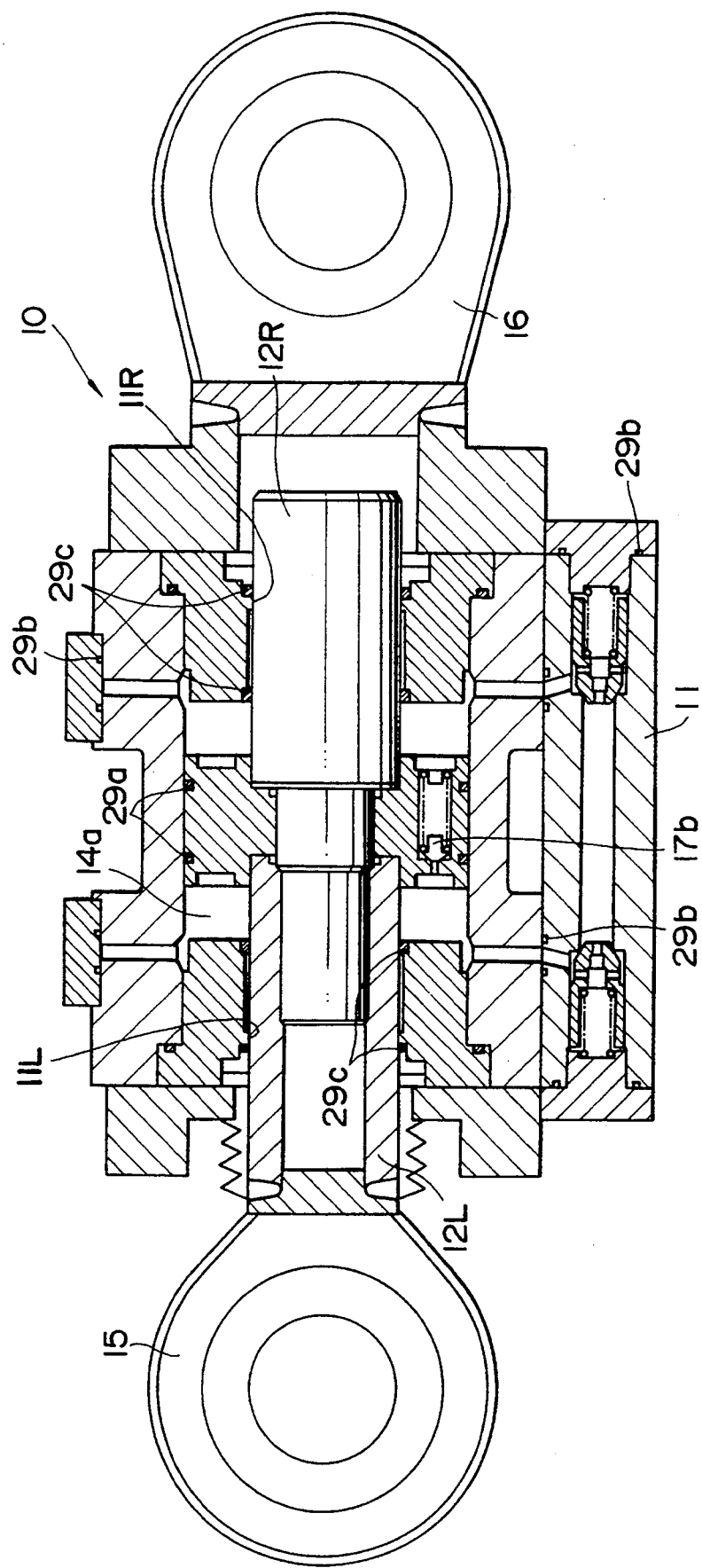
FIG. 4 is a longitudinal sectional view showing a high damping device comprising a preferred embodiment of the present invention.
Figure 5:
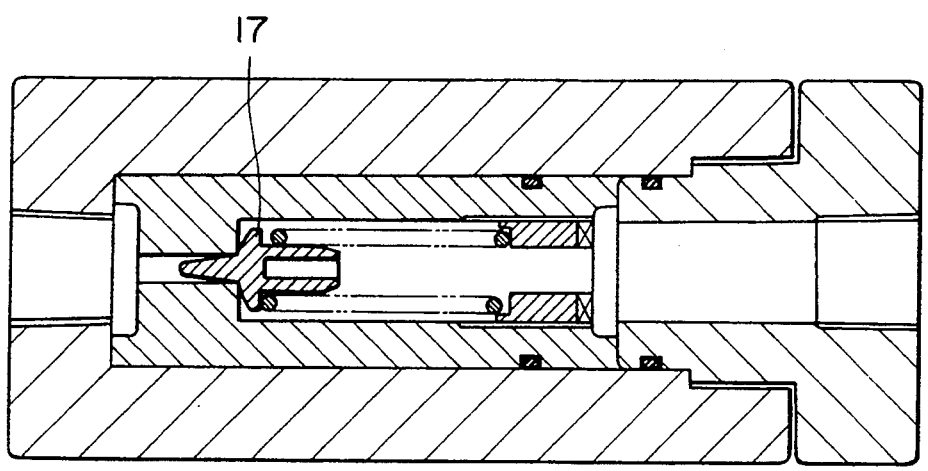
FIG. 5 is a longitudinal sectional view showing a pressure governing valve in detail.

FIG. 4 is an engineering assembly drawing of the invention shown schematically in FIG. 3, with the exception of the oil accumulator subassembly. FIG. 5 is an assembly drawing of pressure governing valve 17 shown schematically in FIG. 3 as valves 17a and 17b. The pressure governing valves 17a and 17b are provided in passages 12a and 12b of FIG. 1., in order to protect the oil seals of the inventive device 10 which enables the inventive device to attain high damping properties.

Figure 6:
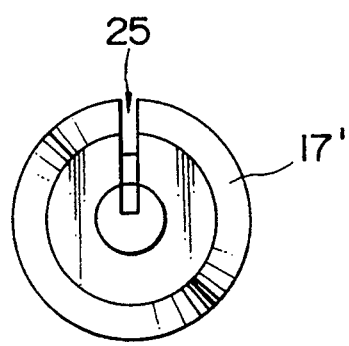
FIG. 6 is an end view of another embodiment of the governing valve taken substantially along the line 6—6 of FIG. 7.
Figure 7:
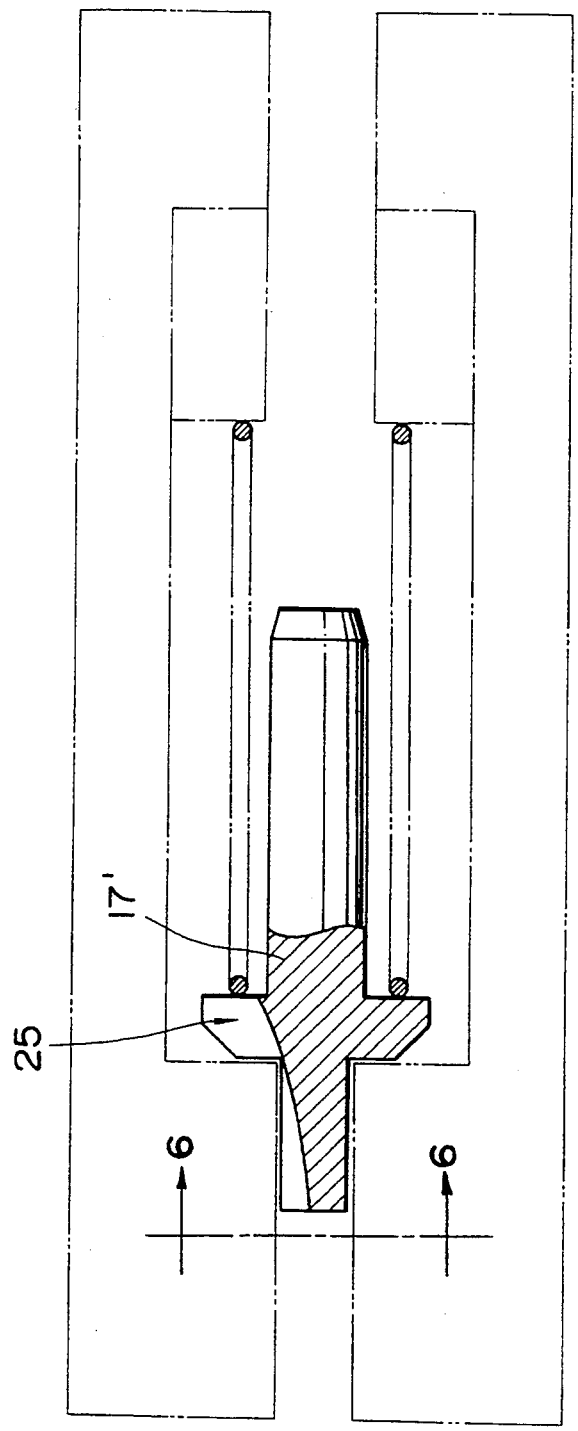
FIG. 7 is a side view, partially in section, of the pressure governing valve of FIG. 6.

In a preferred embodiment of the invention, conical poppet valves 17, such as shown in FIG. 5, are used to achieve desired damping functions of oil. Another embodiment of the pressure governing valves is the proportional valve 17' provided with an oil bypass slot 25 of predetermined proportions, as shown in FIGS. 6 and 7, which may also be used in the inventive device 10. As shown in FIG. 4, multi-stage backup rings reinforce seals 29a, 29b, and 29c, to improve the durability and reliability of the device. For ease of maintenance of the device, fluorocarbon seals 29C made of resin are provided in two stages for the piston rod portions 12L and 12R of the device. The outside seal 29C is replaceable as a cartridge. With this sealing system, it becomes possible to obtain high damping coefficients by improving the sealing property and accuracy of each portion of the device. Although not shown, a three-directional rotatable clevis is used for the mounting ring 15.

Figure 8:
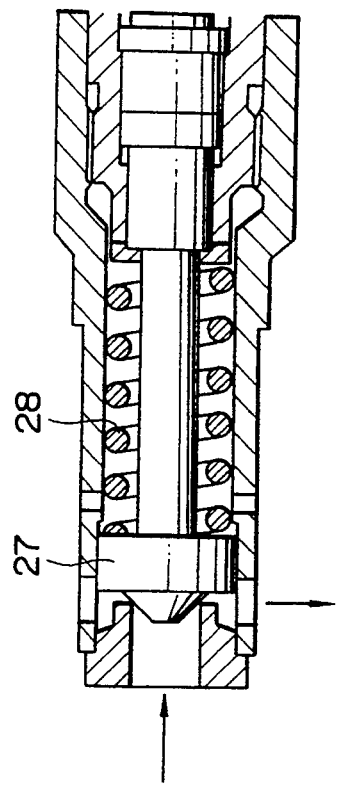
FIG. 8 is a longitudinal sectional view showing a relief valve for use in a preferred embodiment of the invention.

A preferred embodiment of a relief valve 27 is shown in FIG. 8, including an open pressure-setting spring 28. When a seismic tremor exceeds a predetermined level and the pressure at an inflow portion of the total surface on a relief valve 27 reaches a pressure higher than a designed pressure, the resistance of spring 28 is overcome, and valve 27 opens to release the oil pressure.

Figure 9:
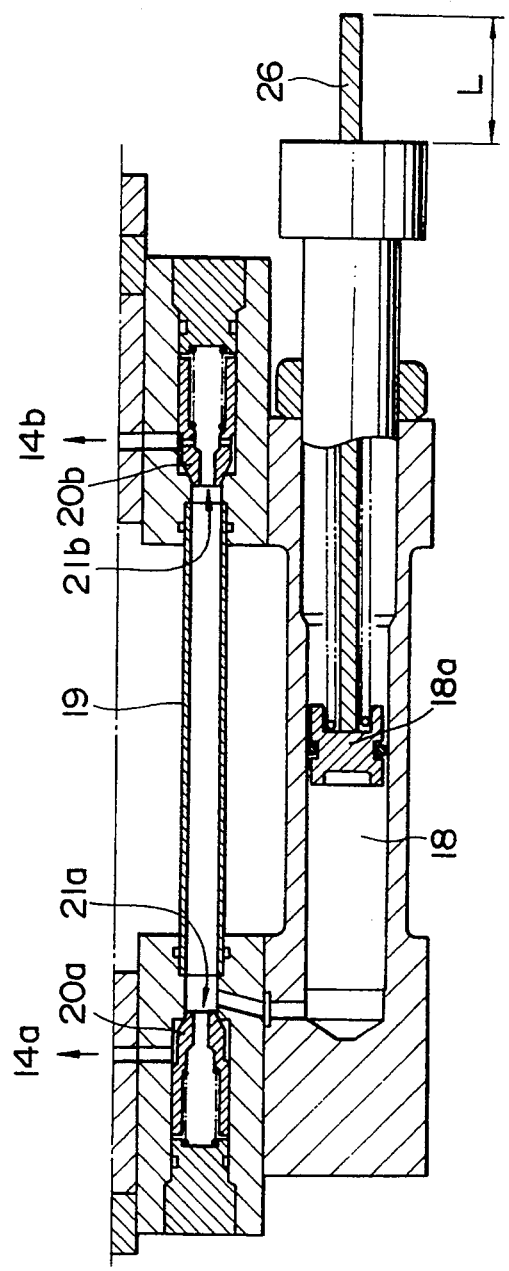
FIG. 9 is a longitudinal sectional view showing the structure of the portions of a bypass and an accumulator for use in a preferred embodiment of the invention.

FIG. 9 is an engineering assembly drawing of the accumulator 18 and the bypass 19 mounted on the side surface of the main body in the high damping device 10. As previously discussed with reference to FIG. 3, check valve 20a is provided between the hydraulic chamber 14a and the accumulator 18 so as to prevent the flow of the oil to the hydraulic chamber 14b. A check valve 20b is also provided between the hydraulic chamber 14b and the accumulator 18 so as to prevent the flow of oil to the hydraulic chamber 14a. Check valves 20a and 20b are mounted in parallel with respective orifices 21a and 21b which function to linearize the damping characteristics of the inventive device 20 and simultaneously relieve the oil pressure within hydraulic chambers 14a and 14b.

The use of nitrogen gas can be avoided by using a piston type accumulator 18 as shown, and accumulated oil is monitored by an oil gauge 26, FIG. 9. Specifically, it is monitored when an increment $\Delta L$ is less than a permissible variation due to temperature, oil leak or the like. A projected length L of monitoring rod 26 for a quantity of oil is expressed by the following equation: $L = L_0 \pm \Delta L$, where $\Delta L$ is less than a permissible variation due to temperature, oil leak, or the like.

Figure 10:
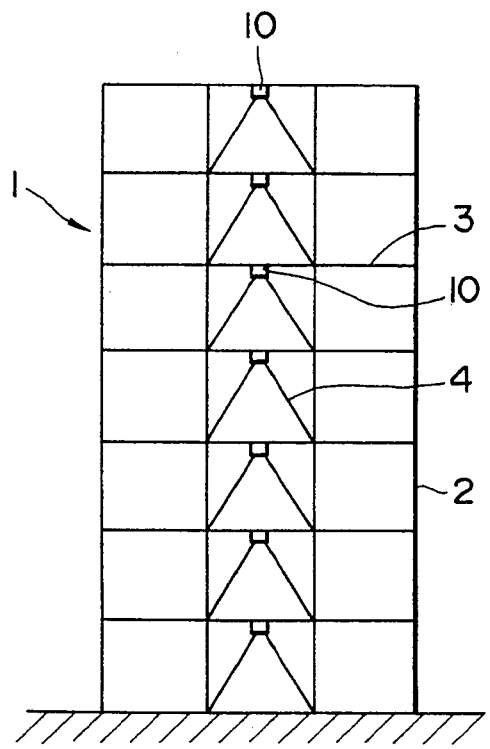
FIG. 10 is a schematic elevational view showing a structure using a high damping device of the present invention.
Figure 11:
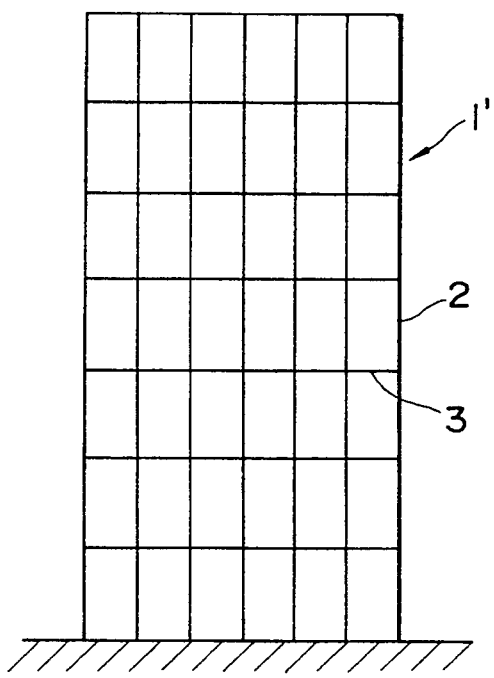
FIG. 11 is a schematic elevational view showing a standard structure for comparison purposes.

Referring to FIG. 10, therein is shown a schematic representation of a structure 1, damped by the inventive device 10. FIG. 11 is a schematic representation of a structure 1' without the damping protection of the inventive device 10. It will be noted that the structure 1 of FIG. 10 requires approximately one-half of the structural columns used in structure 1' of FIG. 11.

As shown in FIG. 10, the inventive device 10 is secured between a floor beam 3 and an earthquake-resisting brace 4, such that the vibrational energy of the structure is absorbed by the installed high damping inventive device 10.

Figure 12:
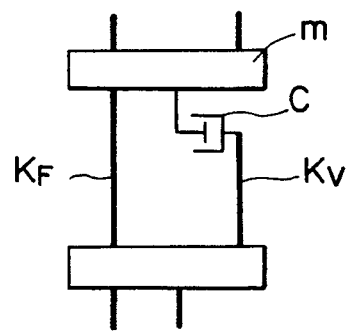
FIG. 12 is a diagrammatic view showing a vibration model of a high damping structure.

FIG. 12 shows a one-floor vibrational model in which c is a damping coefficient of the inventive device 10, $K_F$ is the stiffness coefficient of the column-and-beam frame, and $K_V$ is the stiffness coefficient of the brace 4, not shown.

Figure 13:
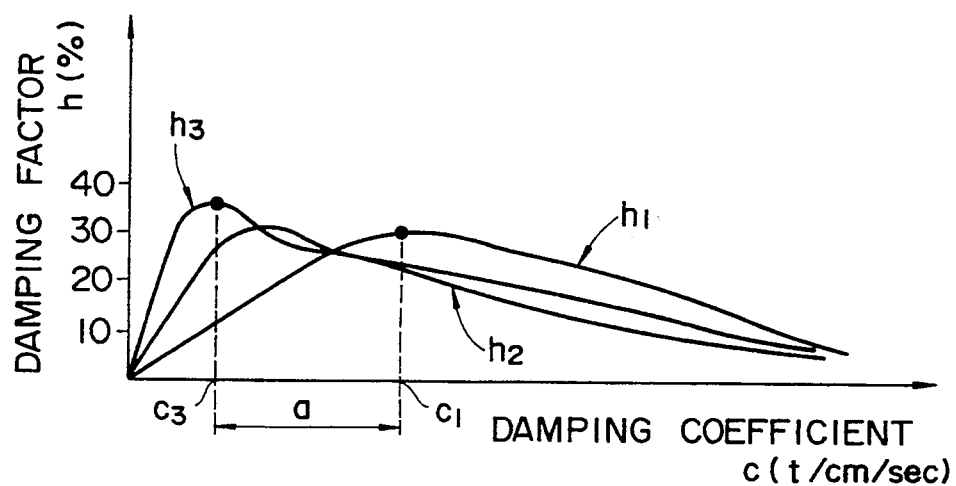
FIG. 13 is a graph showing the relation between the damping factor of a frame obtained by a complex natural valve analysis and the damping coefficient of a high damping device with respect to primary through tertiary modes.

A complex natural vibration coefficient of a multistory building by the FIG. 12 model is obtainable, whereby the damping factor for every mode of the structure may be estimated by the following equation.

$$h_1 = -\text{Re}(\lambda_1)/|\lambda_1| \quad (1)$$

wherein
$\lambda_1$: the i-order complex natural value
$h_1$: the i-order damping factor
$\text{Re}(\lambda_1)$: a real number part of the i-order complex natural value FIG. 13 graphically shows a relationship between the damping factor of the frame obtained from a complex natural value and a damping coefficient c (k/cm/sec) of the high damping device 10 of each floor of the structure with respect to primary through tertiary modes. If a damping coefficient c of the high damping device is set within a range a so that the damping factors $h_1$, $h_2$, or $h_3$ of each curve shown in FIG. 13 is 10 through 40%, a sufficient response reduction can be obtained. Within the range a, the portion between a peak of the tertiary damping factor $h_3$ and a peak of the primary damping factor $h_2$ is acceptable. That is, it is desirable to obtain a damping coefficient $c_3$ so as to obtain the maximum value of the damping factor $h_3$ for the tertiary mode. It is also desirable to obtain a damping coefficient $c_1$ so as to give the maximum value of the damping factor $h_1$ for the primary mode, and to set the damping coefficient c of the inventive high damping device 10 so as to be $c_3 = c = c_1$. If the damping coefficient c is less than $c_3$, the vibration of the frame quickly increases. If the damping coefficient is more than $c_1$, there is not much difference in the vibrational control effect, but the strength required for the high damping device increases.

Figure 14:
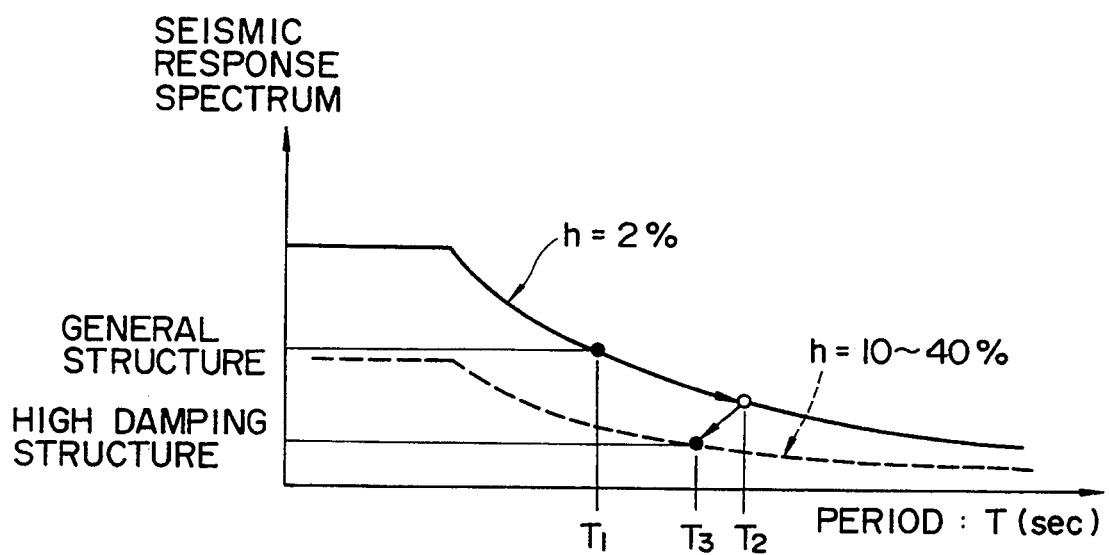
FIG. 14 is a graph showing the response reduction effect observed on the basis of an earthquake response spectrum.

FIG. 14 graphically shows a response reduction effort observed on the basis of an earthquake response spectrum. By approximately halving the column-and-beam frame to a natural period $T_1$ of a general structure, the natural period extends ($T_3$) and the spectrum itself is lowered. At the same time, as the damping effect increases approximately by 2% up to 10% through 40%, the response spectrum is further lowered and the natural period is slightly shortened ($T_3$). At this time, the increase of vibration can be controlled by increase of the damping effect.

With reference to the above graphic representations, an analysis has been done while the damping coefficient c of the inventive high damping device is prescribed. There are, however, some cases where a permissible strength of the inventive high damping device 10 should be taken into consideration as well. That is, the load applied on the device is roughly in proportion to the scale and velocity of a seismic tremor. In case the damping coefficient c is constant, the load applied on the device also becomes greater in proportion to the scale of the tremor. On the other hand, by the action of the above-mentioned relief valves in the inventive device, coefficient c is decreased against the earthquake greater than that of a predetermined level. Accordingly, the load applied can fall in a predetermined constant value, corresponding to the permissible strength of the inventive high damping device.

Figure 15:
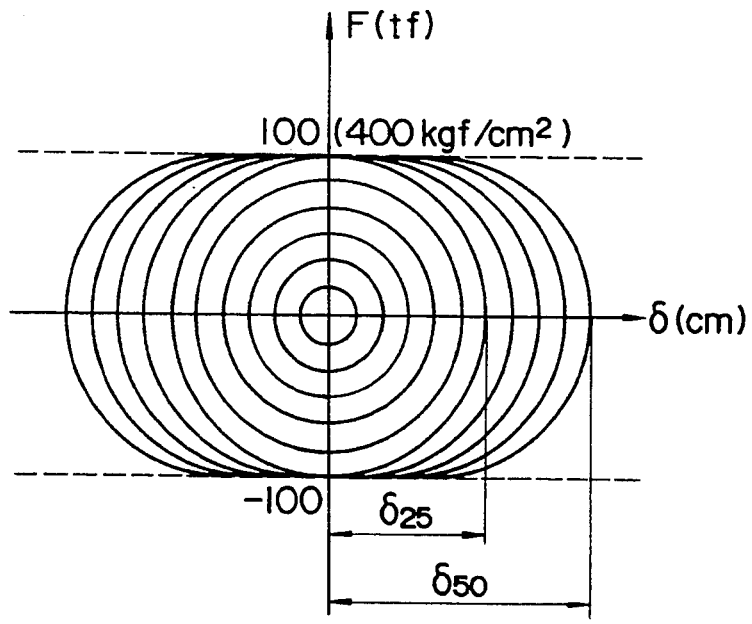
FIG. 15 is a graph showing the characteristics of a relationship between a load and the deformation of a high damping device of the present invention.
Figure 16:
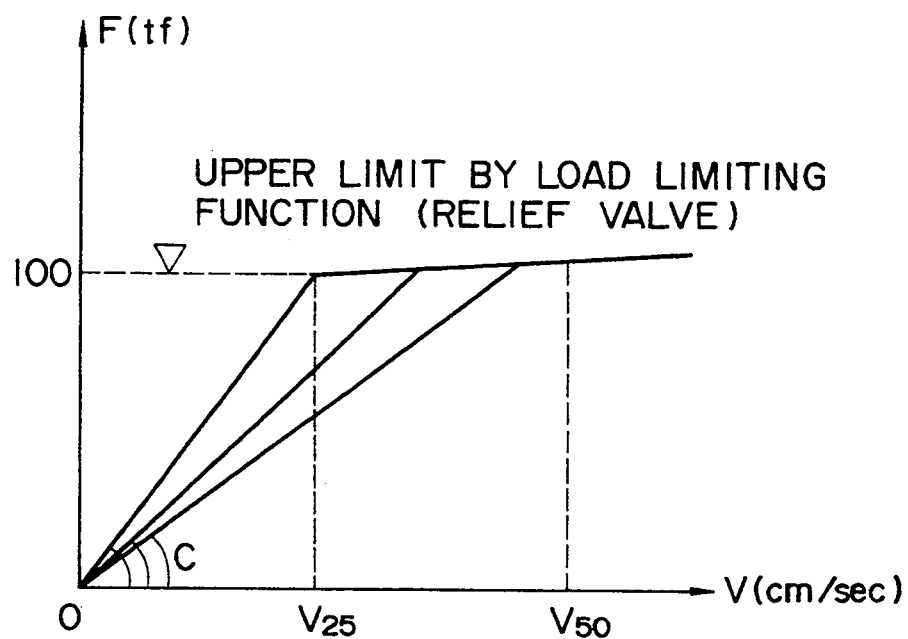
FIG. 16 is a graph showing the characteristics of a relationship between a load and the velocity of a high damping device.

FIGS. 15 and 16 are graphs showing the characteristics of the inventive device. FIG. 15 shows a relation between the load and the deformation against a sine wave on the assumption that $F = cV$ wherein F is the load (tf) applied to the inventive device, c is the damping coefficient (t/cm/sec) of the device, and V is the velocity (cm/sec) of the response. In FIG. 15, $\delta_{25}$ is a deformation of the inventive device due to a response at a level of 25 cm/sec, whereas $\delta_{50}$ is a deformation of the inventive device due to a response at a level of 50 cm/sec. FIG. 16 also graphically shows the relationship between a load and velocity, and both of the figures have their upper limit at a load of 100 tons. It is found that the damping coefficient c decreases from the boundary of the velocity $V_{25}$ due to the earthquake response at a level of 25 cm/sec.

Assume, for purposes of illustration, a twenty-four story building having a steel rigid frame structure 98.1 m in height, 3.90 m in typical floor height, and 1269 m in typical floor area. Further assume the maximum velocity amplitude of the input seismic motion to be at a level of 50 cm/sec. Also assume that there are four inventive high damping devices secured on each floor. In case the rated strength is extremely high, e.g., 200 tons, the damping coefficient c may be set at 25 tons/cm/sec. In order to provide a safety factor for the inventive device, the maximum load that can be applied to the inventive device is limited to 100 tons. The damping coefficient is set at 25 tons/cm/sec against a seismic shock level of 25 cm/sec, and the damping coefficient is decreased against a seismic shock level exceeding this level by the action of the relief valves 27 to maintain the damping effect accompanied by an increase only in the amplitude of the seismic vibration, without producing any increase in the load on the inventive device.

Although the inventive high damping device may be provided on each floor of a structure, it is most efficient on the floor of the structure corresponding to the node of the structure's vibrational mode.

Figure 17:
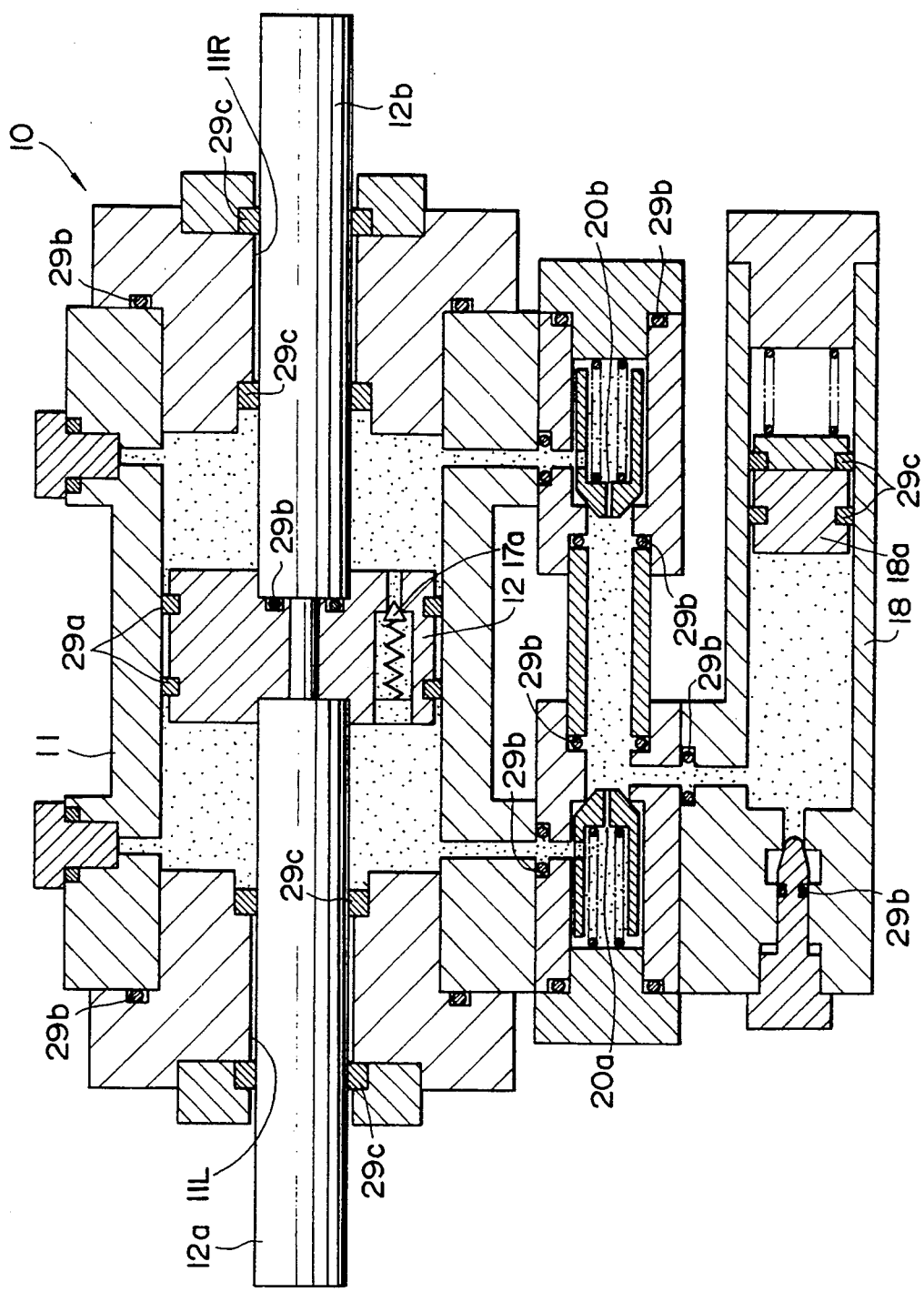
FIG. 17 is a sectional view showing the location of sealing means in a preferred embodiment of the present invention.

The sealing means used in the inventive device are shown in FIG. 17. A metal seal 29a seals the piston 12. Elastic core "Helicoflex" coil springs 29b are used as shown. Because of their special metal coating, these springs are substantially maintenance free. Piston rods 12L and 12R are fitted with fluorocarbon seals 29c made of resin, as is the piston 18a of the accumulator 18. The outer seal of piston 18a need only be replaced approximately once every twenty years, thus providing coterminous protection of the building from seismic shock and vibration.

It will be understood that the above-described embodiments of the invention are for purpose of illustration only. Additional embodiments, modifications, and improvements can be readily anticipated by those skilled in the art based on a reading and study of the present disclosure. Such additional embodiments, modifications, and improvements may be fairly presumed to be within the spirit, scope, and purview of the invention as defined in the claims.

What is claimed is:

1. In the combination of a building vulnerable to the destructive forces of seismic vibration caused by an earthquake, having a first vertical wall support column building structure; a second horizontal floor support beam building structure interconnected to said first vertical wall support column building structure; a third rigid vibration-resisting load bearing building structure interconnected to said first and second building structures; and a passive seismic high damping hydraulic cylinder device interconnected between said first or said second building structure and said third structure to protect said building structures from the impact of said destructive forces of seismic vibration on said building, the improvement comprising: a hydraulic cylinder defining a chamber therewithin; a first piston, having a pair of opposite ends of equal surface area, shiftable within said chamber; a first piston rod secured to said first piston and in shiftable sealed engagement in an orifice in said hydraulic cylinder; hydraulic fluid; means to admit said hydraulic fluid into said hydraulic chamber at opposite ends of said first piston; first means to pass said hydraulic fluid from one of said ends of said first piston to the opposite of said ends of said first piston responsive to a first predetermined unbalance of pressures of said hydraulic fluid at said opposite ends of said first piston caused by shifting of said first piston rod and said first piston responsive to a first predetermined level of said forces of seismic vibration of said building structures; and coefficient of damping adjusting second means to pass said hydraulic fluid from one of said ends of said first piston to the opposite of said ends of said first piston responsive to a second predetermined unbalance of pressures of said hydraulic fluid at said opposite ends of said first piston caused by shifting of said first piston rod and said first piston responsive to a second predetermined level of said forces of seismic vibration of said building structures, whereby said forces of seismic vibration are damped by the passing of hydraulic fluid from one of said ends of said first piston to said opposite of said ends by said first and second means to pass said hydraulic fluid from one of said ends of said first piston to said opposite of said ends of said first piston.

2. The combination of claim 1, including third means to pass hydraulic fluid from said one of said ends of said first piston to the said opposite of said ends of said first piston; a first check valve and bypass orifice in parallel adapted to control said flow of hydraulic fluid in said third means in a first direction; and a second check valve and bypass orifice in parallel adapted to control said flow of hydraulic fluid in said third means in a direction opposite to said first direction.

3. The combination of claim 2, including a hydraulic accumulator positioned intermediate said first and second check valves and bypass orifices whereby said hydraulic accumulator is adapted to provide for expansion and contraction of said hydraulic fluid caused by variations in temperatures of said hydraulic fluids.

4. The combination of claim 3, including means to expand and to contract the capacity of said accumulator responsive to the volume of fluid in said device.

5. The combination of claim 4, including gauge means to indicate the volume of hydraulic fluid in said accumulator.

6. The combination of claim 5, wherein said gauge means comprises a second accumulator a second piston shiftable within said second accumulator, and a second piston rod secured to said second piston in sealed shiftable engagement through an orifice in said second accumulator, a portion of said second piston rod extending exterior of said second accumulator to function as a gauge indicator.

7. In the combination of a building having a first structural member, a second structural member, and a passive seismic high damping hydraulic cylinder device to protect said building from the destructive forces of seismic vibration caused by an earthquake, the improvement comprising: a first hydraulic cylinder having opposed end members; a piston shiftably positioned within said first hydraulic cylinder to form first and second hydraulic chambers on opposite sides thereof between said piston and said opposed end members; a piston rod secured to said piston and extending from said piston to project through one of said opposed end members, said piston rod being secured to said first structural said first hydraulic cylinder being secured to said second structural member, whereby deflection of said first and/or said second structural members will cause said piston and said piston rod to shift in said first hydraulic cylinder toward one of said first hydraulic cylinder opposed end members; hydraulic fluid in said first and second hydraulic chambers; a first pressure governing passageway in said piston providing communication between said first and second hydraulic chambers; a first pressure governing valve in said first pressure governing passageway adapted to render said first pressure governing passageway unidirectional from said first to said second hydraulic chamber; a second pressure governing passageway in said piston providing communication between said first and second hydraulic chambers; a second pressure governing valve in said second pressure governing passageway adapted to render said second pressure governing passageway unidirectional from said second to said first hydraulic chamber; a first pressure relief passageway in said piston providing communication between said first and second hydraulic chambers; a first pressure relief valve in said first pressure relief passageway adapted to render said first pressure relief passageway unidirectional from said first to said second hydraulic chamber; a second pressure relief passageway in said piston providing communication between said first and second hydraulic chambers; and a second pressure relief valve in said second pressure relief passageway adapted to render said second pressure relief passageway unidirectional from said second to said first hydraulic chamber, said first and second pressure governing valves being adapted to open responsive to a first predetermined hydraulic pressure, and said first and second pressure relief valves being adapted to open responsive to a second predetermined hydraulic pressure higher than said first predetermined hydraulic pressure.

8. The device of claim 7, wherein said pressure governing valves are spring biased to open at said first predetermined hydraulic pressure, and said pressure relief valves are spring biased to open at said second predetermined hydraulic pressure.

9. The device of claim 7, including hydraulic bypass means interconnecting said first and second hydraulic chambers.

10. The device of claim 9, including a first check valve and a first orifice positioned in parallel in said hydraulic bypass means to meter the flow of hydraulic fluid from said first hydraulic chamber to second hydraulic chamber; and a second check valve and a second orifice positioned in parallel in said hydraulic bypass means to meter the flow of hydraulic fluid from said second hydraulic chamber to said first hydraulic chamber.

11. The device of claim 9, including a hydraulic fluid accumulator positioned in said hydraulic bypass means intermediate said first and second check valves and orifices.

12. The device of claim 11, wherein said hydraulic fluid accumulator comprises a second hydraulic cylinder having opposite end portions, and a second piston shiftably mounted in said second hydraulic cylinder adapted to shift therein responsive to hydraulic pressure in said second hydraulic cylinder.

13. The device of claim 12, including a second piston rod secured to said second piston and extending in sealed engagement through one of said opposite end portions a distance proportional to the volume of hydraulic fluid in said second hydraulic cylinder.

14. The combination of claim 1, wherein said seismic high damping hydraulic cylinder device comprises a hydraulic cylinder and a piston slidably mounted therein and is interconnectable to said building structures by (a) selectively connecting said hydraulic cylinder to said first building structure or to said second building structure and by connecting said piston rod to said third building structure, or by (b) connecting said hydraulic cylinder to said third building structure and by selectively connecting said piston rods to said first building structure or to said second building structure.

* * * * *

UNITED STATES PATENT AND TRADEMARK OFFICE
CERTIFICATE OF CORRECTION

PATENT NO. : 5,347,771
DATED      : September 20, 1994
INVENTOR(S): Kobori et al.

It is certified that error appears in the above-identified patent and that said Letters Patent is hereby corrected as shown below:

Claim 7, column 8, line 49, after "structural" insert
--member;--

Signed and Sealed this

Twenty-ninth Day of November, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,347,771
DATED : Sep. 20, 1994
INVENTOR(S) : Kobori et al.

It is certified that error appears in the above-identified patent and that said Letters Patent is hereby corrected as shown below:

Title page, item [56],

Under "References Cited" "U.S. Patent Documents" on the face of the patent,

"No. 5,065,522  11/1991  Kobori et al." should read

--No. 5,065,552  11/1991  Kobori et al.--

Signed and Sealed this

Twenty-eight Day of March, 1995

Attest:

BRUCE LEHMAN

Attesting Officer

Commissioner of Patents and Trademarks